United States Patent
Pinto et al.

(10) Patent No.: US 7,834,921 B1
(45) Date of Patent: * Nov. 16, 2010

(54) COMPENSATION TECHNIQUES FOR VARIATIONS IN IMAGE FIELD DATA

(75) Inventors: Victor Pinto, Zychron-Yaakov (IL); Erez Galil, Sunnyvale, CA (US)

(73) Assignee: Zoran Corporation, Sunnyvale, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/144,616

(22) Filed: Jun. 23, 2008

Related U.S. Application Data

(63) Continuation of application No. 10/749,669, filed on Dec. 30, 2003, now Pat. No. 7,391,450, which is a continuation-in-part of application No. 10/222,412, filed on Aug. 16, 2002, now Pat. No. 7,408,576.

(51) Int. Cl.
*H04N 9/64* (2006.01)
*H04N 5/225* (2006.01)

(52) U.S. Cl. ...................... 348/251; 348/335
(58) Field of Classification Search ............... 348/241, 348/222.1, 335, 340, 615, 251; 396/545
See application file for complete search history.

(56) References Cited

U.S. PATENT DOCUMENTS

| | | | |
|---|---|---|---|
| 4,482,975 A | 11/1984 | King et al. | |
| 4,947,445 A | 8/1990 | Sakamoto et al. | |
| 5,047,861 A | 9/1991 | Houchin et al. | |
| 5,181,098 A | 1/1993 | Guerin et al. | |
| 5,267,055 A | 11/1993 | Sakamoto et al. | |
| 5,343,302 A | 8/1994 | Yamashita | |
| 5,621,824 A | 4/1997 | Ijiri et al. | |
| 5,675,380 A | 10/1997 | Florent et al. | |

(Continued)

FOREIGN PATENT DOCUMENTS

EP  0720125  7/1996

(Continued)

OTHER PUBLICATIONS

Chinese Patent Office, *Notification of First Office Action* dated Mar. 7, 2008 in Chinese Application No. 200580003885.X, 8 pages.

(Continued)

*Primary Examiner*—Jason Chan
*Assistant Examiner*—Nicholas G Giles
(74) *Attorney, Agent, or Firm*—Frommer Lawrence & Haug LLP; John W. Branch

(57) ABSTRACT

Techniques for modifying data of an image that can be implemented in a digital camera, video image capturing device and other optical systems are provided to correct for image shading variations appearing in data from a two-dimensional photo-sensor. These variations can be caused by imperfect lenses, non-uniform sensitivity across the photo-sensor, and internal reflections within a housing of the optical system, for example. In order to correct for these variations, a small amount of modification data is stored in a small memory within the camera or other optical system, preferably separate correction data for each primary color. The modification data is generated on the fly, at the same rate as the image data is being acquired, so that the modification takes place without slowing down data transfer from the image sensor.

29 Claims, 7 Drawing Sheets

U.S. PATENT DOCUMENTS

| | | | |
|---|---|---|---|
| 5,784,100 | A | 7/1998 | Konishi |
| 5,973,735 | A | 10/1999 | Stekelenburg et al. |
| 6,195,469 | B1 * | 2/2001 | Nishioka et al. ............ 382/274 |
| 6,323,934 | B1 | 11/2001 | Enomoto et al. |
| 6,833,862 | B1 * | 12/2004 | Li ......................... 348/207.99 |
| 6,940,546 | B2 | 9/2005 | Gallagher |
| 7,098,945 | B1 * | 8/2006 | Sasai et al. ............... 348/223.1 |
| 7,268,917 | B2 | 9/2007 | Watanabe et al. |
| 2002/0025164 | A1 * | 2/2002 | Suzuki ....................... 396/429 |
| 2002/0094131 | A1 | 7/2002 | Shirakawa |
| 2002/0101522 | A1 | 8/2002 | Hosier et al. |
| 2002/0135688 | A1 | 9/2002 | Niikawa |
| 2002/0165890 | A1 | 11/2002 | Thakur |
| 2003/0156190 | A1 | 8/2003 | Sato et al. |
| 2003/0156204 | A1 * | 8/2003 | Sato et al. ................ 348/222.1 |
| 2003/0169345 | A1 * | 9/2003 | Rykowski et al. ...... 348/207.99 |
| 2004/0257454 | A1 | 12/2004 | Pinto et al. |
| 2005/0041806 | A1 | 2/2005 | Pinto et al. |
| 2008/0273812 | A1 | 11/2008 | Fujita et al. |

FOREIGN PATENT DOCUMENTS

| | | |
|---|---|---|
| JP | 09307789 | 11/1997 |
| JP | 10142065 | 5/1998 |
| JP | 10160566 | 6/1998 |
| JP | 2000253410 | 9/2000 |
| JP | 2001274973 | 10/2001 |
| JP | 2002216136 | 8/2002 |
| JP | 2002237998 | 8/2002 |
| WO | WO-02/27804 | 4/2002 |
| WO | WO-02/059837 | 8/2002 |
| WO | WO-02/065760 | 8/2002 |
| WO | 2005043891 A1 | 5/2005 |

OTHER PUBLICATIONS

Chinese Patent Office, *Notification of the First Office Action* dated Apr. 11, 2008 in Chinese Application No. 200480038566.8 , 7 pages.
European Patent Office, *Communication pursuant to Article 94(3) EPC* dated Aug. 22, 2008 in EP Application No. 05705546.9, 4 pages.
European Patent Office, *Communication pursuant to Article 96(2) EPC* dated Oct. 15, 2007 in EP Application No. 04814198.0, 4 pages.
European Patent Office, *International Search Report and the Written Opinion of the International Searching Authority* mailed Apr. 19, 2005 in PCT Application No. PCT/2005/000938, 15 pages.
European Patent Office, *International Search Report and the Written Opinion of the International Searching Authority* mailed May 2, 2005 in PCT Application No. PCT/US2004/041987, 15 pages.
European Patent Office, International Search Report dated Nov. 12, 2003 in PCT Application No. PCT/US03/24189, 7 pages.
Japanese Patent Office, *Notification of Reasons for Refusal* mailed Sep. 24, 2008 in JP Application No. 2004-529235, 7 pages.
Patterson, David A.; *Computer Organization and Design: The Hardware/Software Interface*; 1998; Morgan Kaufmann Publishers, Inc., San Francisco, CA; 2nd Ed.; Chapter 4, Section 4.6; pp. 250-253.
U.S. Patent Office, *Office Communication* mailed Apr. 20, 2007 in U.S. Appl. No. 10/222,412, 26 pages.
U.S. Patent Office, *Office Communication* mailed Jul. 12, 2007 in U.S. Appl. No. 10/749,669, 13 pages.
U.S. Patent Office, *Office Communication* mailed Jul. 12, 2007 in U.S. Appl. No. 10/770,696 , 11 pages.
U.S. Patent Office, *Office Communication* mailed Mar. 9, 2006 in U.S. Appl. No. 10/222,412, 23 pages.
Wikipedia—the Free Encyclopedia, *Taylor Series*, <http://en.wikipedia.org/w/index.php?title=Taylor_series&direction=prev&oldid=2432603> Jan. 7, 2004, 3 pages.
U.S. Appl. No. 12/140,257, Official Communication mail date Jan. 4, 2010.

* cited by examiner

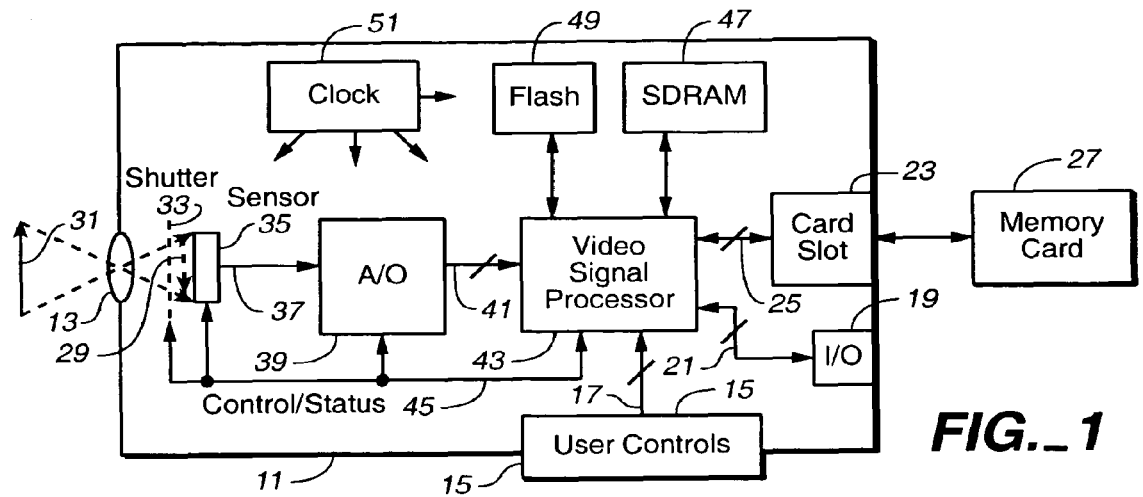
FIG._1
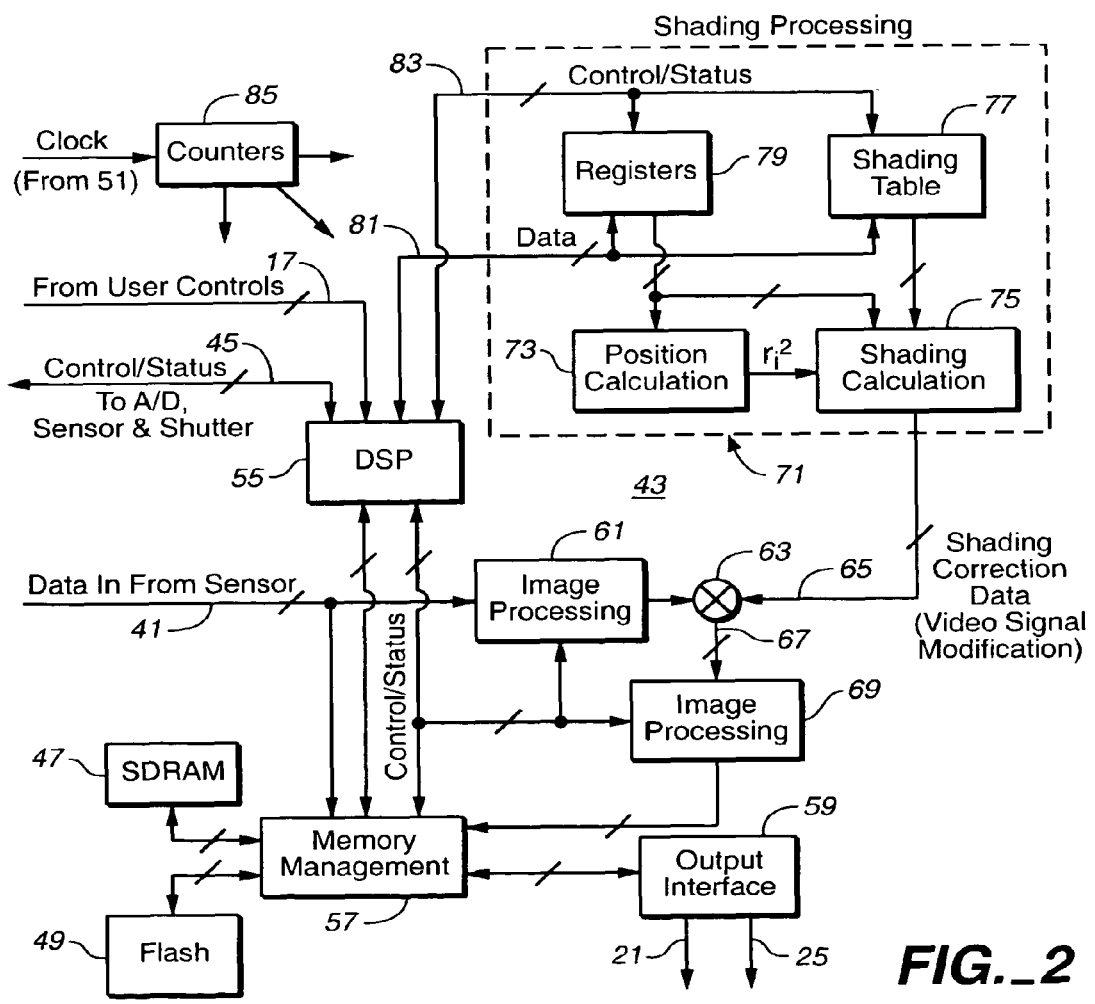
FIG._2

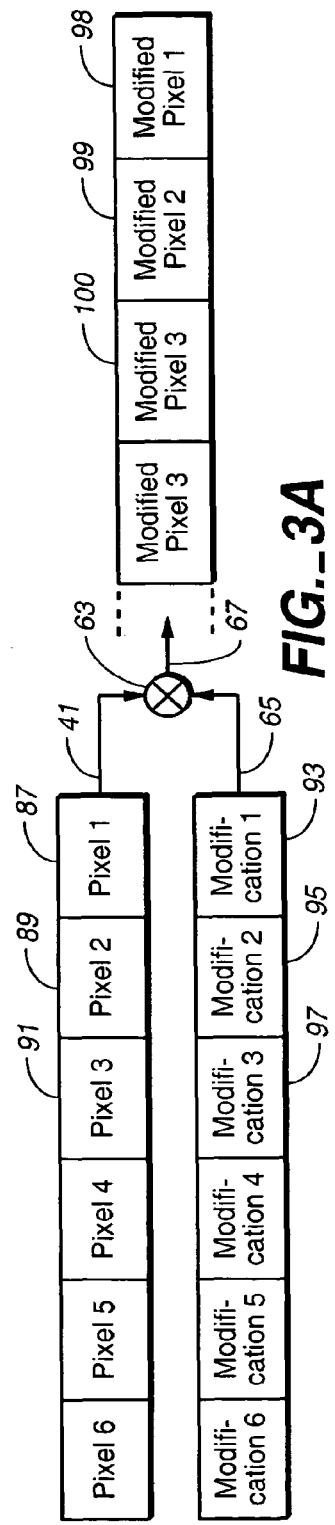
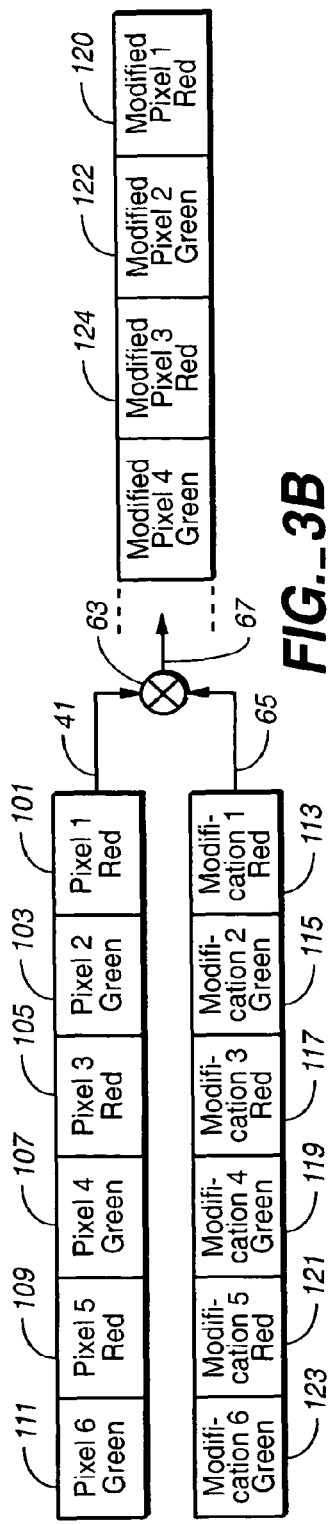
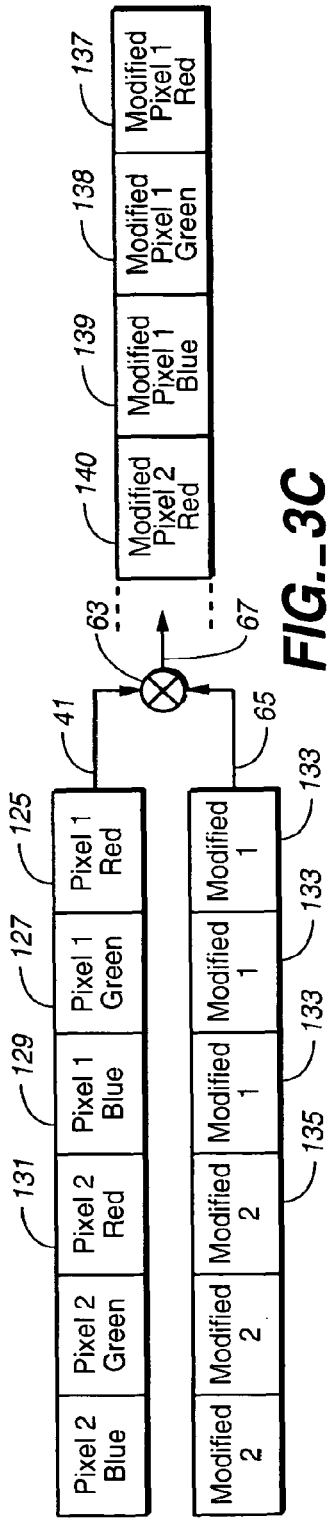
FIG._3A  FIG._3B  FIG._3C

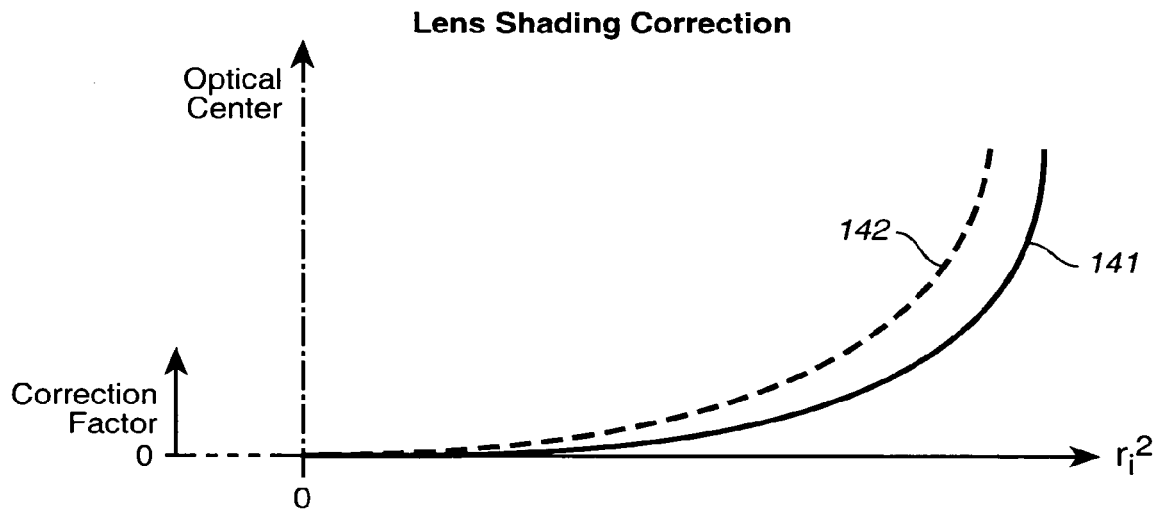
FIG._4A
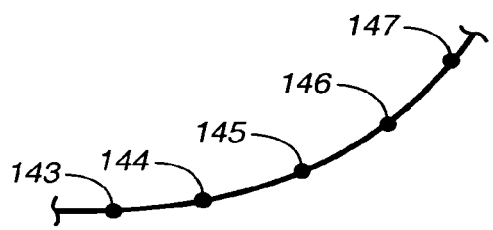
FIG._4B
Shading Table 77
| $R^2$ Interval | Red | | Green | | Blue | |
|---|---|---|---|---|---|---|
| | Base | Slope | Base | Slope | Base | Slope |
| 0 | — | — | — | — | — | — |
| 1 | — | — | — | — | — | — |
| 2 | — | — | — | — | — | — |
| 3 | — | — | — | — | — | — |
| ⋮ | • | • | • | • | • | • |
| ⋮ | • | • | • | • | • | • |
| 63 | — | — | — | — | — | — |
FIG._5

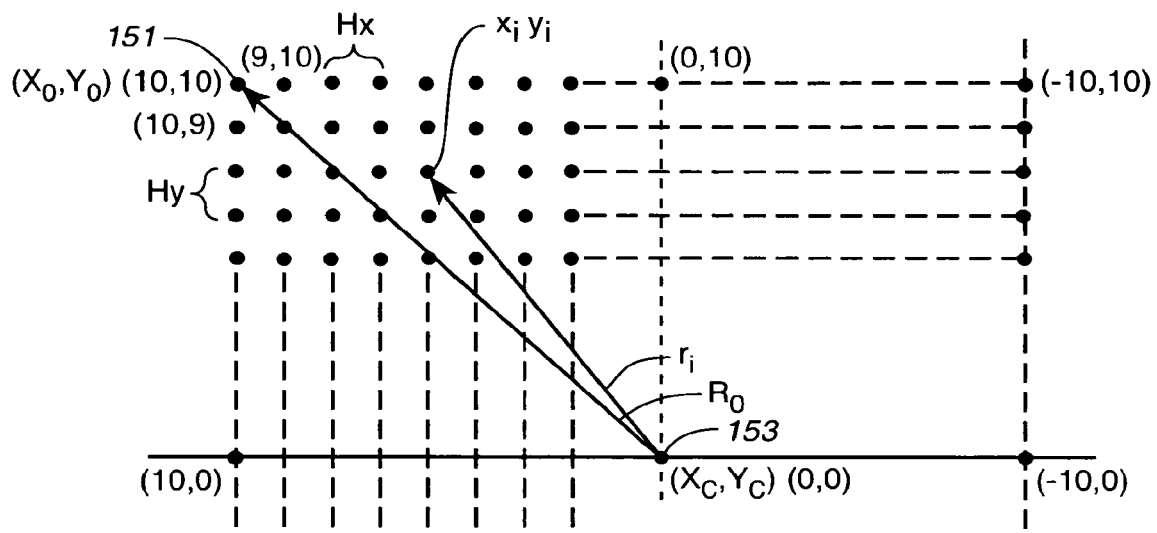
FIG._6
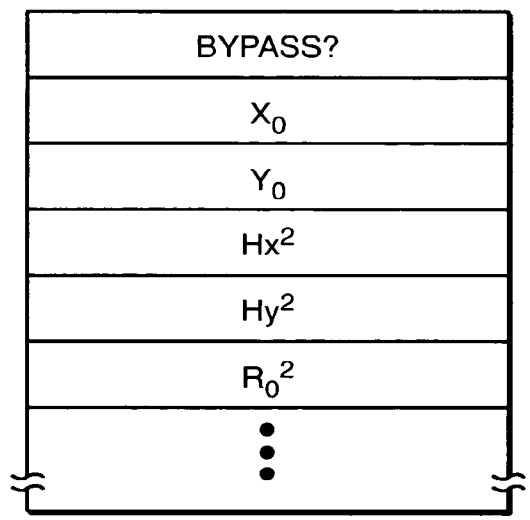
FIG._7

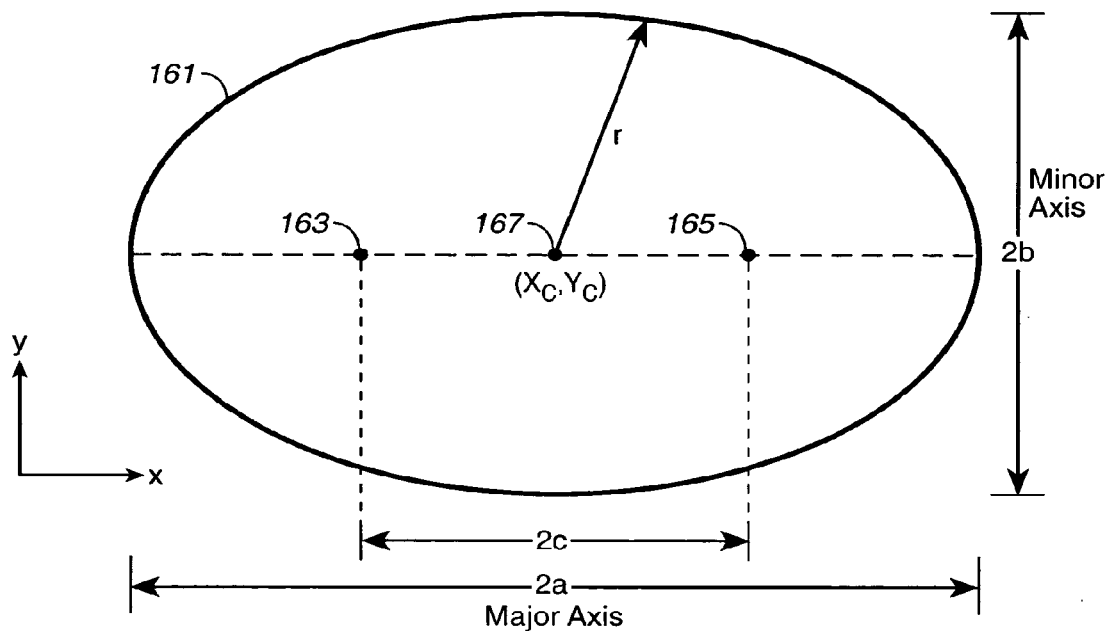
FIG._8
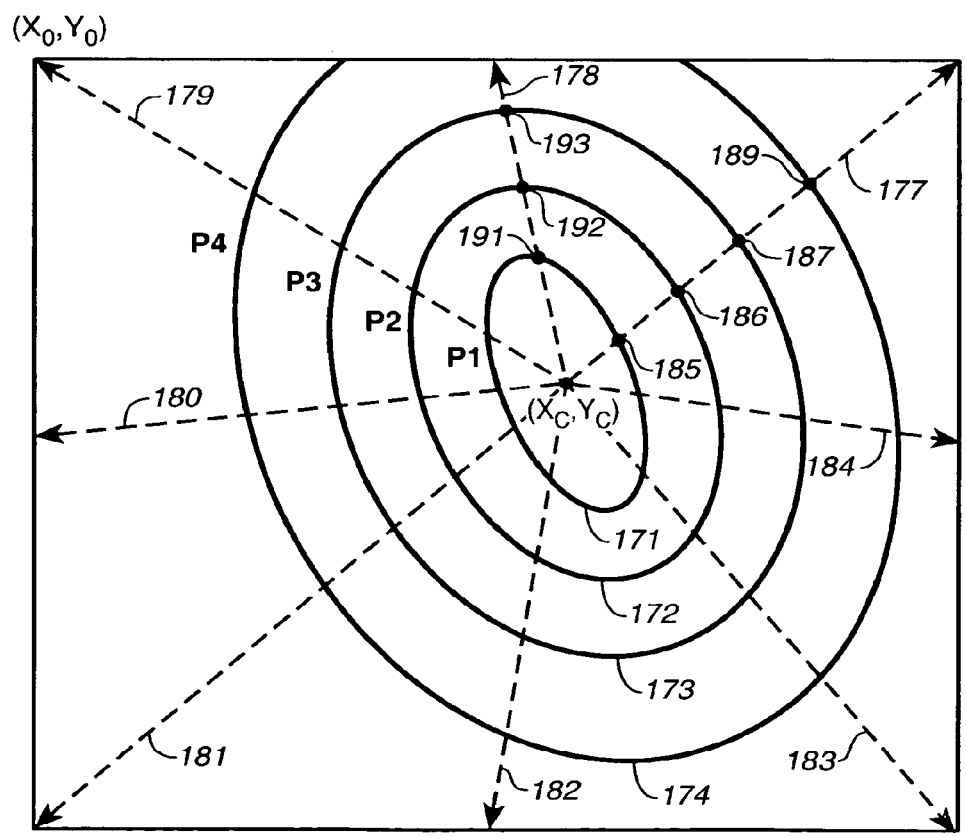
FIG._9

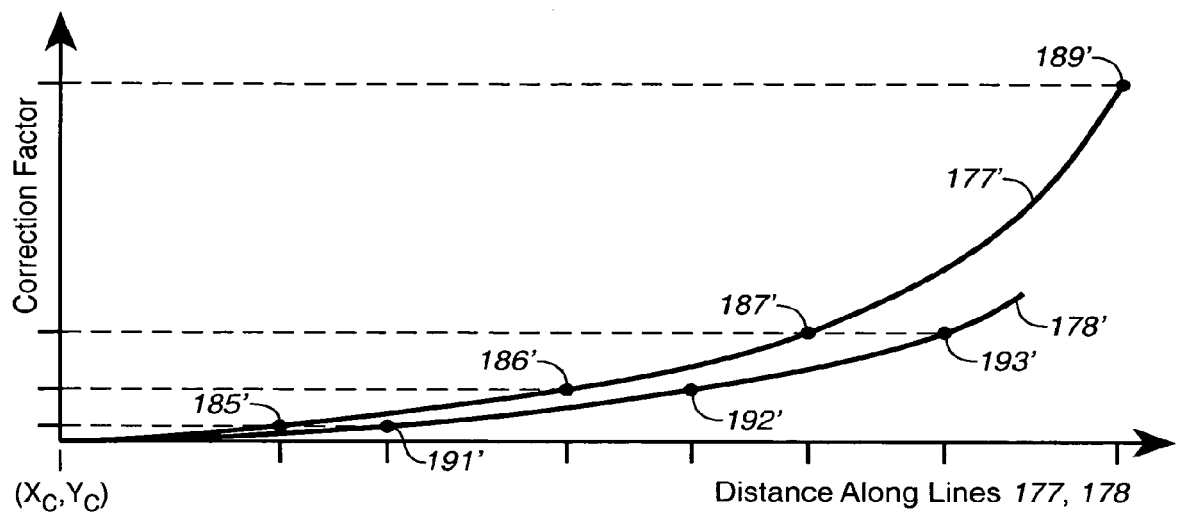
FIG._10
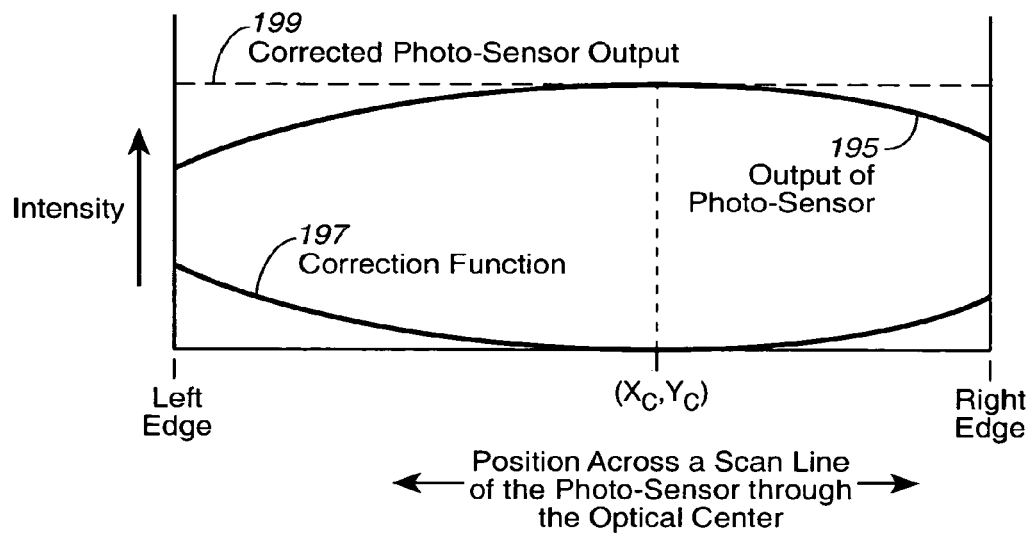
FIG._11

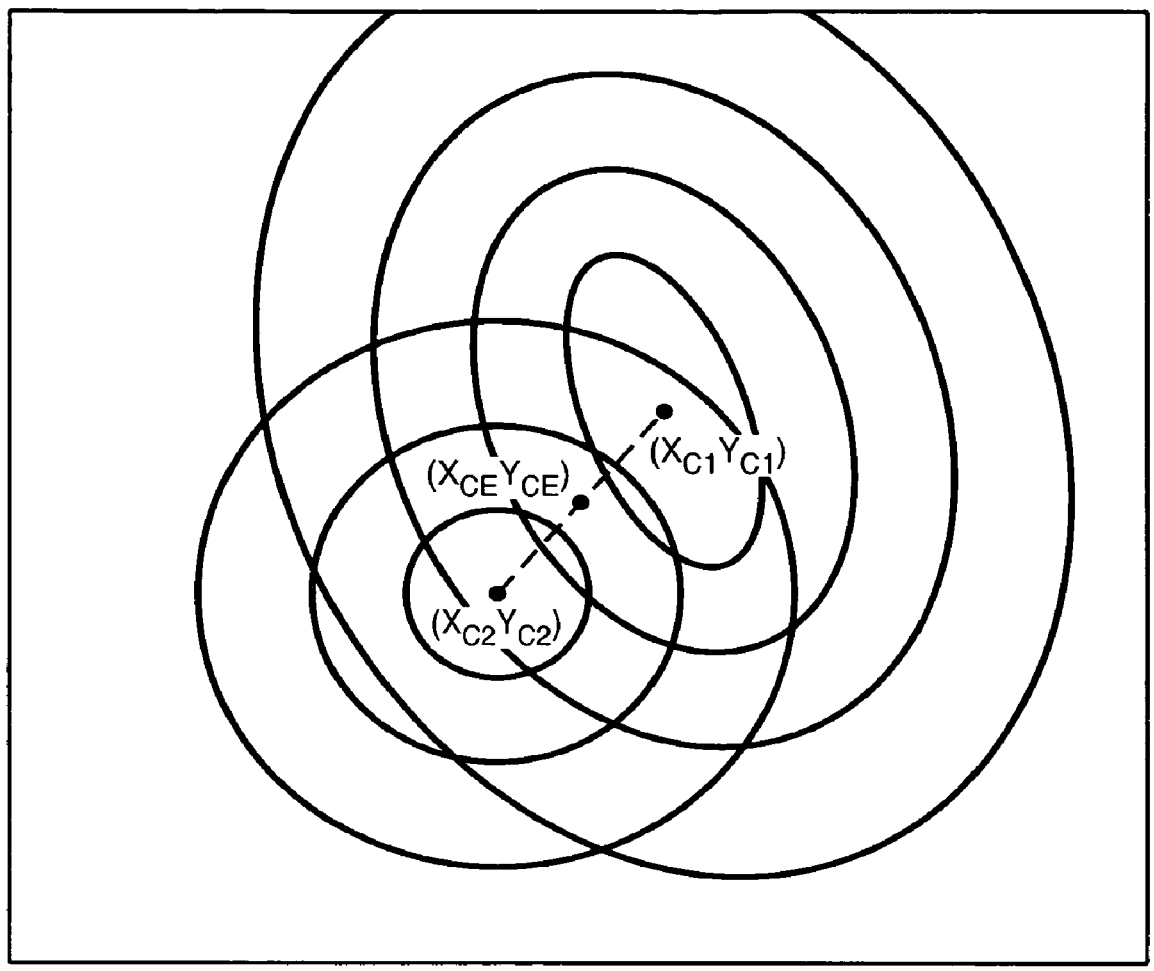
FIG._12

COMPENSATION TECHNIQUES FOR VARIATIONS IN IMAGE FIELD DATA

CROSS-REFERENCE TO RELATED APPLICATION

This application is a Continuation of U.S. Ser. No. 10/749,669, filed Dec. 30, 2003, which is a Continuation-In-Part of U.S. Ser. No. 10/222,412, filed Aug. 16, 2002, and is related to U.S. Ser. No. 10/770,696, filed Feb. 2, 2004, which is a Continuation-In-Part of the '412 application, and U.S. Ser. No. 12/140,257, filed on Jun. 16, 2008, which is a Continuation of the '696 application, all four of which are incorporated herein by reference.

FIELD OF THE INVENTION

This invention relates generally to techniques of processing video signal data, and, more specifically, to processing video binary data to correct for variations across an imaged optical field such as, for example, to compensate for shading effects caused by lenses, sensor sensitivity variations and housing internal reflections in cameras and the like.

BACKGROUND

Image shading is a non-uniform light response across an image field. It can be attributed in an optical system to characteristics of a lens, sensitivity variations across a photo-sensor on which light is directed, improper alignment of a lens in relation to the image plane of the photo-sensor employed, internal cameral reflections, and possibly other factors that may be present in a particular system. In the case of a lens alone, a simple lens used to view a scene with a uniform light intensity across it will typically produce an image of that scene having a significantly non-uniform light intensity. The light intensity is normally highest in the middle of the image and falls off on its edges, as much as sixty percent or more. Such a lens obviously is not suitable for most optical applications without this effect being corrected. Correction can be provided by the use of a complex assembly of lenses that images scenes without imparting intensity variations across it.

Electronic cameras image scenes onto a two-dimensional sensor such as a charge-coupled-device (CCD), a complementary metal-on-silicon (CMOS) device or other type of light sensor. These devices include a large number of photo-detectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data of the intensity of radiation striking one sensor element after another as they are scanned. Color data are most commonly obtained by using photo-detectors that are sensitive to each of distinct color components (such as red, green and blue), alternately distributed across the sensor. Shading effects of lenses that image object scenes onto the photo-sensor, non-uniform sensitivity of the photo-sensor to various colors of light striking it, and potentially other factors, cause an uneven distribution of light across the photo-sensor, and thus video signals from the sensor include data of the undesired intensity variation superimposed thereon.

Rather than eliminating the lens shading effect by the use of a complex and expensive lens, along with an expensive and carefully selected image photo-sensor, it has been suggested that the signals from the photo-sensor may be processed in a manner to compensate for these effects. The amount of compensation applied to the signal from each photo-detector element is dependent upon the position of the element across the surface of the image photo-sensor.

SUMMARY OF THE INVENTION

The electronic signal processing techniques of the present invention allow compensation for lens shading and/or other similar phenomenon, such as sensor sensitivity variations and internal camera reflections, which superimpose a predictable optical variation onto the image across a multi-element photo-sensor. These techniques have particular application to digital cameras and other types of video devices but are not limited to such optical photo system applications. The techniques may be implemented at a low cost, require a minimum amount of memory, and operate at the same rate as the video data being modified is obtained from the photo-sensor, thereby not adversely affecting the performance of the video system. This is accomplished by applying correction factors in real time to the output signals of the photo-sensor in order to compensate for undesired intensity patterns across the photo-sensor that are complex as well as patterns that are regular in shape such as circular, elliptical or hyperbolic shaped patterns.

In an example of such compensation, the data of each pixel is corrected by an amount that is a function of the radius of the pixel from the optical center of the image or other light pattern (also referred to herein as the anchor point or center of gravity of the light pattern). The position of each pixel is first converted from a x-y coordinate position of the raster or other linear scanning pattern to a radial distance, and then that radial distance is used to generate the correction for the pixel from a small amount of correction information stored in a small memory. This avoids having to keep correction data for each pixel, and thus saves having to include a large memory to store such data. Use of circuits dedicated to carrying out these operations allows them to be performed at the same rate as the video data is outputted by the photo-sensor, without having to employ an extremely fast, expensive digital signal processor. In a particular application, the radial position of a pixel is calculated from the scan position by an adder circuit without the need for more complex circuitry to perform multiplication or division.

Each camera or optical system of some other device is calibrated, in one example, by imaging a scene of uniform intensity onto the photo-sensor, capturing data of a resulting intensity variation across the photo-sensor, characterizing the intensity variation according to a known geometric pattern and then storing a relatively few data points defining the geometric pattern, in order to minimize the amount of memory required to store correction data. A determination of correction values between the stored values are obtained during the image modification process by a form of interpolation. In order to avoid noticeable discontinuities in the image intensity, these few data points are preferably fit to a smooth curve that is chosen to match the intensity variation across the image that is to be corrected. In addition to correcting for lens shading, these techniques also correct for any intensity variations caused by the photo-sensor and/or its interaction with the incident image light.

Additional objects, advantages and features of the present invention are included in the following description of exemplary embodiments thereof, which description should be taken in conjunction with the accompanying drawings. Each patent, patent application, article or publication referenced herein is hereby incorporated herein in its entirety for all purposes by such reference.

BRIEF DESCRIPTION OF THE DRAWINGS

FIG. 1 schematically illustrates an electronic video device in which the techniques of the present invention may be utilized;

FIG. 2 is a block diagram of a portion of the electronic processing system of the device of FIG. 1;

FIGS. 3A, 3B and 3C illustrate the modification of three different types of video data by the system of FIG. 2;

FIG. 4A is a curve of a sample intensity correction function across a radius of an image;

FIG. 4B illustrates one way to represent the curve of FIG. 4A with a reduced amount of data stored in a memory of FIG. 2;

FIG. 5 provides an example of a form of data representing the curve of FIG. 4A that is stored in a memory of FIG. 2;

FIG. 6 illustrates one way of calculating the radial position of an image pixel from its linear scan position by the processing system of FIG. 2;

FIG. 7 illustrates data that are stored in registers of FIG. 2;

FIG. 8 shows an ellipse with quantities used herein defined;

FIG. 9 illustrates an example lens shading pattern being compensated;

FIG. 10 shows sample intensity variation curves along two radial lines of FIG. 9;

FIG. 11 includes curves to illustrate the effect of image compensation provided by the techniques described herein; and FIG. 12 illustrates a multiple image shading pattern for which compensation is provided.

DESCRIPTION OF EXEMPLARY EMBODIMENTS

The superimposition of variations onto an image or other desired light pattern, due to the phenomena previously discussed, results in a variation of energy in each pixel of that image. These energy variations are not related to the captured image data itself. In order to compensate for this variation in energy across the photo-sensor, each pixel value could be combined, such as by multiplication, with a shading correction density factor. This factor is unique to each pixel in the image sensor according to the pixel's geographic location in the image sensor matrix. In the ideal case, a table of factors could be created during a calibration procedure that stores the required compensation factor for each pixel of the image in memory. This would allow the needed shading compensation to be effected by executing the following equation with a processing unit in the image capturing device:

$$\text{PixelOut} = \text{PixelIn} * F(X, Y) \quad (1)$$

Where,

PixelOut=The output of the Image Shading Compensation module; in other words the corrected pixel, PixelIn=The input to the Image Shading Compensation module. The pixel before correction, and F(X,Y)=The correction factor, which depends on the pixel's position expressed in terms of X and Y rectangular coordinates.

It would be very costly to implement the process defined by this equation on an integrated circuit with the storage of correction factors for each pixel of the photo-sensor, primarily because of the large memory that would be required and thus the large area of silicon necessary for implementation. Therefore, the techniques described herein employ unique approximations of this process that require very little memory and processing power but yet eliminate the undesired light patterns from the image.

A minimum number of shading correction factors are stored in one or more sparse two-dimensional lookup tables. A separate lookup table can be used for each color. These tables can be based on radial, hyperbolic or orthogonal coordinate systems. At the time of image shading correction, for example in a digital camera, one or more two dimensional extrapolation algorithms are used to calculate a shading correction factor for each color, or a single correction factor for all colors, at each picture element position, from a small number of shading correction factors that are stored in a non-volatile memory within the camera. These shading correction factors, which are derived during a calibration procedure in which a uniform intensity image is employed, need not be uniformly allocated across the image field. In a specific implementation, the correction factors are based upon circular, elliptical or hyperbolic functions defined from the optical center of the shaded image representation resulting from the use of an imperfect lens or photo-sensor. These correction factors are acquired during the camera's calibration procedure. The "optical center" (or alternatively the "center of gravity" or "anchor point") of an image field is classically defined as:

$$(X_C, Y_C) = (I_1 D_1 + I_2 D_2 + \ldots)/(I_1 + I_2 + \ldots) \quad (2)$$

where $I_1, I_2 \ldots$ are the intensities of image pixels $1, 2 \ldots$ with respect to a defined single image origin reference point $(X_0, Y_0)$, and $D_1, D_2 \ldots$ are the distances that these respective image pixels are displaced from $(X_0, Y_0)$.

For a circular shading pattern caused by an imperfect lens, the center of gravity is at the maximum intensity point of the varying intensity shading pattern projected onto an image photo-sensor. In one embodiment, this center of gravity is used as the singular reference data point for the lookup table discussed above. This provides a finer grained shading correction on the periphery of the image field to more effectively correct for a circular, elliptical or hyperbolic shading pattern.

An extension corrects for complex shading patterns caused by multiple simultaneously occurring factors, such as non-uniform image sensor sensitivity in combination with lens vignetting. In a first form of this extension, the algorithm, which calculates the correction factors incorporated in the sparse lookup table discussed above, is chosen to be a function of the distance between a picture element and an "effective center of gravity". This effective center of gravity is derived by first isolating each shading phenomena (that is, each separate non-uniform light pattern) and then calculating the center of gravity for each phenomena, using the center of gravity formula (2) above. These two or more centers of gravity are then algorithmically combined to form the effective center of gravity used by the invention. If an orthogonal coordinate system is employed, the combining algorithm used to derive the effective center of gravity can be the simple linear averaging of the coordinates of each of the two or more calculated centers of gravity, as shown in the following equation:

$$(X_{CE}, Y_{CE}) = [(X_{C1} + X_{C2} + X_{C3} \ldots + X_{CN})/N], [(Y_{C1} + Y_{C2} + Y_{C3} \ldots + Y_{CN})/N] \quad (3)$$

where $(X_{CE}, Y_{CE})$ are coordinates of the effective center of gravity, $(X_{CN}, Y_{CN})$ are the coordinates of each of the individual centers of gravity associated with each shading phenomena, and N is the total number of individual phenomena and thus the total number of centers of gravity. Alternatively, this determination may be performed by the use of more complex, linear and non-linear weighting functions.

In a second form of this extension, the image shading correction factors are chosen to be a function of the distances between individual pixels and multiple centers of gravity, each center of gravity calculated from the same or a different defined point of origin. Calibration, including calculation of correction factors, in this approach is likewise effected by isolating each shading phenomena. However, in this case, the individual correction factors derived by the use of these two or more centers of gravity are algorithmically combined to create a single set of shading correction factors which are employed to compensate for multiple shading phenomena at scene capture time. The algorithm employed to derive these combined shading correction factors can use either linear, piece wise linear, or non-linear weighting, thus providing a large degree of flexibility in choosing image shading correction factors with respect to a particular image element location.

Note that in the case of a digital camera, one way to isolate shading pattern phenomena is to first, with the camera's lens removed, illuminate the digital camera's photo-sensor with uniform light. This permits the shading pattern associated with sensor alone to be measured, and the sensor's shading pattern center of gravity to be calculated. Then, illuminate the camera's photo-sensor with uniform light through the camera's lens, and again measure the resulting shading pattern. The shading pattern produced by the lens alone is then derived by subtracting, on a pixel-by-pixel basis, the results of the first measurement from the second. The lens shading pattern center of gravity can then be separately calculated.

In the present description, shading correction factors for an optical photo system, (that is, the lens, image sensor, and/or housing) of a digital camera, video capturing device or other type of digital imaging device, are derived during a calibration procedure. This calibration is performed by imaging a scene of uniform intensity onto the image sensor employed by the device being calibrated, using the lens and housing of the device being calibrated. Data of the resulting circular, hyperbolic or other variation across the image sensor are derived by measurement of image sensor photo detector signals and a compensating mathematical function or functions are calculated. Only a relatively few data points are preferably stored, in order to minimize the amount of memory required to store correction data, and a determination of values between the stored values is obtained, during the image modification process, by a form of interpolation, which is responsive to the shading correction factors calculated at the time of calibration. In order to avoid noticeable discontinuities in the image intensity, these few data points are preferably fit to a smooth curve or curves that are chosen to match the intensity variation or variations across the image that are to be corrected. Since the complete optical photo system of the digital imaging device is employed during the calibration procedure, these techniques correct for any intensity variations caused by the image sensor and/or its interaction with the incident image light, in addition to correcting for non-uniformities due to lens shading alone.

Optical Device Example

An implementation of the techniques of the present invention is described in a camera or other video acquisition device, where digital data of the image(s) are modified on the fly to compensate for intensity modifications superimposed across the image by the camera's optical system, photo-sensor and reflections from internal camera surfaces. In FIG. 1, such a camera is schematically shown to include a case 11, an imaging optical system 13, user controls 15 that generate control signals 17, a video input-output receptacle 19 with internal electrical connections 21, and a card slot 23, with internal electrical connections 25, into which a non-volatile memory card 27 is removably inserted. Data of images captured by the camera may be stored on the memory card 27 or on an internal non-volatile memory (not shown). Image data may also be outputted to another video device through the receptacle 19. The memory card 27 can be a commercially available semiconductor flash electrically erasable and programmable read-only-memory (EEPROM), small removable rotating magnetic disk or other non-volatile memory to which video data can be programmed by the camera. Alternatively, particularly when the camera is taking movies of thirty image frames per second or the like, larger capacity storage media can be used instead, such as magnetic tape or a writable optical disk.

The optical system 13 can be a single lens, as shown, but will normally be a set of lenses. An image 29 of a scene 31 is formed in visible optical radiation through a shutter 33 onto a two-dimensional surface of an image sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of video data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

Processing of the video data in circuits 41 and control of the camera operation are provided, in this embodiment, by a single integrated circuit chip 43. In addition to being connected with the circuits 17, 21, 25 and 41, the circuit chip 43 is connected to control and status lines 45. The lines 45 are, in turn, connected with the shutter 33, sensor 29, analog-to-digital converter 39 and other components of the camera to provide synchronous operation of them. A separate volatile random-access memory circuit chip 47 is also connected to the processor chip 43 for temporary data storage. Also, a separate non-volatile re-programmable memory chip 49 is connected to the processor chip 43 for storage of the processor program, calibration data and the like. A usual clock circuit 51 is provided within the camera for providing clock signals to the circuit chips and other components. Rather than a separate component, the clock circuit for the system may alternatively be included on the processor chip 43.

A functional block diagram of the processor chip 43 is shown in FIG. 2. A digital signal processor (DSP) 55 is a key component, controlling both the operation of the chip 43 and other components of the camera. But since the DSP 55 does not extensively process video data, as discussed below, it may be a relatively simple and inexpensive processor. A memory management unit 57 interfaces the DSP 55 to the external memory chips 47 and 49, and to output interface circuits 59 that are connected to the input-output connector 19 and to the card slot 23 (FIG. 1) through respective circuits 21 and 25.

The flow of video data through the block diagram of FIG. 2 from the analog-to-digital converter 39 (FIG. 1) is now generally described. The input data in lines 41 is pre-processed in a block 61 and then provided as one input to a multiplier circuit 63. Another input 65 to the multiplier 63 carries data that modifies the incoming video data, the modified video data appearing at an output 67 of the multiplier 63. In this example, the modification data in lines 65 correct for the effects of lens shading and intensity variations imparted across the image by camera elements. After further image processing 69, as appropriate, the video data are directed through the memory management unit 57 to the output interface circuits 59 and then through either lines 21 to the input-output receptacle 19 or through lines 25 to the memory card slot 23 (FIG. 1), or both, of the camera for display and/or storage.

The correction data in lines 65 are generated by a block of dedicated processing circuits 71. The block 71 includes circuits 73 that calculate a quantity related to the radial position of each image pixel from an effective center of the image for which video data are being acquired, in the order of such acquisition. In this specific example, this quantity is the mathematical square of the radius ($r_i^2$). This radius is calculated for each pixel from the linear position in x-y coordinates of the photo-detector(s) generating the video signal for that pixel, and at the same rate at which the video data are being received from the sensor. This conversion of linear to radial position is made since the modification of the image data varies as a function of radius across the image. That calculated radius function is then used by a calculation circuit 75 to generate the modification factor applied to the multiplier 63. Although the circuits 75 could solve an equation each time that represents the radius dependent modification to be made to the video data, a memory 77 stores a look-up table that is used in this embodiment instead. But in order to reduce the size of the memory 77, only a few points of correction data are stored and the circuits 75 calculate the values of points in between those that are stored. A set of registers 79 store parameters that are used by both of the calculation circuits 73 and 75.

The calculation circuits 73 and 75 operate independently of the DSP 55. The DSP could possibly be used to make these calculations instead but this would require an extremely fast processor, if sufficient speed were even available, would be expensive and would take considerable more space on the chip 43. The circuits 73 and 75, dedicated to performing the required repetitive calculations without participation by the DSP 55, are quite straightforward in structure, take little space on the chip 43 and frees up the DSP 55 to perform other functions.

The memory or memories 77 and 79 storing the image modification data and parameters are preferably a volatile random-access type for access speed and process compatibility with other processor circuits so that they can all be included on a single cost effective chip. The image modification data and parameters are generated once for each camera at a final stage of its manufacture and then are permanently stored in the non-volatile memory 49. These data are then loaded through lines 81 into the memories 77 and 79 each time the system is initialized, under control of the DSP 55 operating through control and status lines 83.

With reference to FIG. 3A, one aspect of the operation of the system of FIG. 2 is explained where the sensor 35 (FIG. 1) includes a single photo-detector for each image pixel. The digitized output 41 of the sensor includes successive blocks 87, 89, 91, etc. of data from adjacent photo-detectors of the sensor 35 in one row. Each block of data, containing 10, 12 or more bits that quantify the intensity of one pixel of the image 29 being sensed by a single photo-detector element, appears in the circuits 41 at a rate controlled by the system clock 51 through controlling counters 85 (FIG. 2). One of the data blocks 87, 89, 91, etc. can appear during each cycle of a clock signal, for example.

Data blocks 93, 95, 97, etc. are generated by the modification processing circuits 71 (FIG. 2) at the same rate and in synchronism with the image data 87, 89, 91, etc. That is, the modification data 93 are generated to appear at the multiplier 63 at the same time as the image data 87, and so on. Since the scanning pattern of the photo-detectors is known, the calculating circuits 73 generate the radii of the positions of the photo-detectors across the surface of the sensor 35 in the same order and at the same rate as the image data is read out from those photo-detectors. Modification factor data generated for a particular image pixel is then combined with data of the intensity of that pixel. Combination in the multiplier 63 of image data 87 with the generated modification data 93 for the same pixel results in modified data 98. Modified data blocks 99 and 100 are similarly obtained by combinations of data 89 and 95, and 91 and 97, respectively.

The usual video system processes data for each of multiple distinct color components of the image. A typical commercial sensor alternates photo-detectors along the rows that are covered with red, green and blue filters. There are several different arrangements of the color sensitive photo-detectors that are commercially used. In one such arrangement, one row contains alternating red and green sensitive photo-detectors, while the next row contains alternating blue and green sensitive photo-detectors, the photo-detectors also being positioned along the rows to provide alternating color sensitivity in columns. Other standard arrangements use other combinations of two alternating colors. As indicated in FIG. 3B, the output in lines 41 of one such sensor include successive pieces of red, green and blue data. Blocks 101, 103, 105, etc. represent separate data of alternating red and green sensitive photo-detectors, one block being outputted during each of successive clock cycles.

If there is only one set of correction data for all of the discrete colors being detected, an image modification factor is generated for each image pixel from that set of data, regardless of the color. This is quite adequate in cases where the variation across the image that is being removed by the signal modification affects all colors to the same or nearly the same degree. However, where the variation is significantly color dependent, separate correction factors are used for each color component. Use of color dependent modification is illustrated in FIG. 3B, wherein the successive modification factors 113, 115, 117, etc. are combined with each successive block of image data 101, 103, 105, etc. The result is modified data blocks 120, 122, 124 etc. The modification factors 113, 117, 121, etc. are taken from red correction data, while the modification factors 115, 119, 123, etc. come from green correction data.

One particular type of photo-sensor that is commercially available stacks multiple photo-detectors at each photo-site or pixel. The top detector passes the colors red and green, while filtering out the color it is sensitive to, for example blue. The detector immediately beneath this top detector passes the color green and filters out the color it is sensitive to, in this example red. The bottom sensor is then sensitive to the color green. FIG. 3C illustrates operation of the system of FIG. 2 with this type of sensor. Blocks of data 125, 127, 129, 131, etc. are outputted, three for all the colors of one pixel, another three for the next adjacent pixel, and so on. If only one set of correction data is maintained for all colors, the same modification factor is combined with the three data blocks from each photo-site, such as the modification factor 133 for the site generating the color data blocks 125, 127 and 129. If separate correction data are maintained for each color, the modification factors can be different but all three are calculated for a single radial position across the image sensor. When combined in the multiplier 63, successive modified data blocks 137, 138, 139 etc. result.

Other types of color systems can also be corrected by the techniques described herein. There was a commercial color system, for example, that used only two color components. Also, there are four-color systems in which a separate detector with a wide spectral range is used to acquire "black and white" information.

Circular Pattern Modification

Many shading patterns, particularly those of lenses, can be characterized as circular in shape. Thus, the correction factor for each pixel may then be computed as a one-dimensional function along the geometric distance to a reference on the image geometric plane using the following equation:

$$\text{PixelOut} = \text{PixelIn} * F[(X-X_C)^2 + (Y-Y_C)^2] \quad (4)$$

Where PixelOut is the output of the corrected value of a pixel positioned at (X,Y) that has been input before correction of PixelIn. The correction factor $F[(X-X_C)^2 + (Y-Y_C)^2]$ is dependent upon the distance of the pixel (X,Y) to the image's center of gravity $(X_C, Y_C)$.

An example lens shading correction function 141 is illustrated in FIG. 4A. Keep in mind that although an isolated lens shading correction function is being shown to illustrate the invention, the invention is generally applicable to the correction of a wide variety of shading non-uniformities from numerous causes. Again, shading non-uniformity can also be attributed to non-uniform sensor sensitivity and internal camera reflections, to name just two. If variations caused by these sources were to be corrected for in combination with variations caused by lens characteristics, the actual correction function is different, as discussed below, but the general approach is the same.

As can be seen from FIG. 4A, at an optical center of the image 29 across the photo-detector array of the sensor 35 (FIG. 1), the correction is a relative zero. The center is preferably the point of an image of an object scene having uniform intensity thereacross where the detected image intensity is maximum. In general, however, the optical center $(X_C, Y_C)$ is determined from equation (2) above. The intensity of the detected image then decreases as a function of radial distance $r_i$ away from that center. As a result, the amount of intensity correction, the lens shading gain, applied to the detected image signal increases as a function of the radius $r_i^2$, as indicated by the curve 141. The amount that the image intensity is increased goes up rapidly at the edge of the image. This lens shading effect has been found to be circularly symmetrical; that is, the desired correction indicated by the curve 141 is substantially the same along any radial line extending across the detected image from its optical center.

Many lenses cause shading patterns similar to the one depicted in FIG. 4A. In these cases, the curve 141 has been found to approximate an exponential function of the square of the radius; that is, the intensity correction for any image pixel is a function of a square of its radial distance from the optical center, $f(r_i^2)$. An equation can thus be written for each camera or other optical system employing a lens with this shading characteristic that is solved by the DSP 55 or dedicated circuits for each pixel to determine the amount of correction for that pixel. But it has been found to be more efficient to maintain a table of values of the curve 141 that are looked-up during the image processing. FIG. 4B shows an expanded view of a portion of the curve 141, wherein the values of successive points 143-147 are taken to represent the curve. In a specific case of camera correction, only 64 values, taken at equal increments of radius along the curve 141, are stored to represent the curve. In order to calculate the amount of correction for radii in between these points, the calculator 75 (FIG. 2) could use some interpolation algorithm but it has been found preferable to also store values of the slopes of straight lines between each successive pair of points 143-147, which the calculator 75 then also uses.

An example of the shading table 77 (FIG. 2) is illustrated in FIG. 5. In this case, data of three separate correction curves are maintained, one for each of the primary colors red, green and blue. A second such curve 142 is shown in FIG. 4A, for example. For each of 64 intervals a base value of $r_i^2$ is stored as well as a value of the slope of a straight line from that base value to the next base value. For each value of $r_i^2$ input to the calculation circuits 75, these circuits provide values of correction factors for the red, green and blue components of the detected image in time sequence, which are then used to correct the incoming video data as previously described with respect to FIG. 3B. Of course, if each color component is to receive the same correction factor as illustrated in FIG. 3A, the table of FIG. 5 needs to maintain only one set of base and slope numbers. In either case, the amount of data stored in the table 77 is small, so the size of the memory required to be included on the chip 43 to store it can be kept small.

An example technique implemented by circuits 73 (FIG. 2) for calculating $r_i^2$ values to input to the calculation circuits 75 is illustrated in FIG. 6. The calculation is made from knowing the positions of the individual sensor photo-detectors in an x-y coordinate system, and then converting the measure of those positions to values of their radii from the optical center in a circular coordinate system. The calculation is simplified by using the fact that the photo-detectors are scanned in straight lines across the sensor 35, one row at a time, from one end to the other, in a raster pattern, until the outputs of all photo-detectors have been received to obtain a full frame of video data.

In FIG. 6, individual photo-sites or pixels are indicated by black dots. One, two, three or more photo-detectors are positioned at each pixel, depending upon the type of sensor that is used, examples of which are described above. Although a typical rectangular array contains hundreds or thousands of pixels on each side, the array of FIG. 6 is assumed to be 20 by 20 pixels in size, for purposes of explaining the calculation process. A pixel 151 is the extreme upper-left pixel of the array, with a position designated as $X_0Y_0$ since it is in the first row and first column of the array of pixels. The pixel 151 is the first pixel scanned when a frame of video data is being acquired. The other pixels in the top row are then scanned in order to obtain their signal outputs in that order, followed by scanning the pixels of the second row from the top, from the leftmost pixel to the right, and so on, in a standard video raster scanning pattern. A pixel 153 is selected to be at the center of the shading pattern of the lens that images a scene onto the photo-detector array. Pixel 153 is the shading functions optical center and its location is noted as $(X_C, Y_C)$. The address of the shading pattern center pixel 153 is designated as (0, 0). If this pixel is also the center pixel of the array, as is assumed for simplicity in this description, the pixel 151, in the small illustrative array being considered, carries an address of (10, 10). The next pixel to the right has an address of (9, 10), the first pixel of the second row (10, 9), and so forth. The radius of the first pixel 151 from the center $(X_C, Y_C)$ is designated as $R_0$, and that of a generalized pixel $x_iy_i$ as $r_i$.

The quantity $r_i^2$ is calculated by the circuits 73 (FIG. 2) for each pixel from its rectangular coordinates $(x_i, y_i)$. In order to greatly simplify the circuits that perform this calculation, the algorithm executed by the circuits 73 preferably relies upon arithmetic addition without the need for any of multiplication, division, square-root, or other more complicated arithmetic operations. The square of the radius of each pixel is calculated by the use of adders. This algorithm can now be described.

At the beginning of the scanning of a designated line of pixels, the initial radius $R_{INIT}$ from the center to the first pixel (left most pixel) of a given line is calculated, as follows:

$$R_{INIT}^2 = |R_0^2 - 2Y_0 H_Y + (1+2n_Y)H_Y^2| \tag{5}$$

where $Y_0$ refers to the y-coordinate of the upper most line and $R_0$ is the radius from the center $(X_C, Y_C)$ to the upper-left most pixel $(X_0, Y_0)$. The algorithm also accommodates scanning patterns that omit a proportion of the pixels or lines of pixels. The quantity $H_Y$ represents the number of lines in each step. If each line is being scanned, $H_Y=1$, if every other line is being scanned, $H_Y=2$, and so on. The quantity $n_Y$ is the number of the line actually being scanned (if lines are being skipped, $n_Y$ still counts 0, 1, 2 etc.), counting from the top where $n_Y=0$ for the second line, $n_Y=1$ for the third line, and so on.

In order to simplify the radius calculations, some of the frequently referenced quantities are calculated once during factory calibration and then permanently stored in the non-volatile memory 49 (FIG. 2) and transferred during system initialization to the register 79 (FIG. 2) as illustrated in FIG. 7. The quantities $Y_0$ and $R_0$ used in the above equation are also so stored, for example. The quantity $H_Y^2$ is also stored in the registers 79 but this can be re-written by the DSP 55 as the character of the scan changes due to the function selected by the user of the camera or other system through the controls 15 (FIG. 1). Since the radius function $R_0^2$ of the first pixel 151 to be scanned is already known, the circuits 73 need only read that value from the registers 79 and apply it to the calculating circuits 75. But the radius function for the next pixel (9, 10), and the remaining pixels of a frame, need to be calculated by the circuits 73.

For each pixel along this designated line of pixels, the radius $r_i^2$ from the center (0, 0) to each given pixel is calculated in order, as follows:

$$r_i^2 = |R_{INIT}^2 - 2X_0 H_X + (1+2n_X)H_X^2| \tag{6}$$

where $R_{INIT}^2$ is the radius of the first pixel of the line calculated by equation (1) above, $X_0$ refers to the x-coordinate of the initial pixel of the line, $H_X$ is the number of pixels in each step, and $n_X$ is the number of the pixel actually being used (if pixels are being skipped, $n_X$ still counts 0, 1, 2, etc.), counting from the left where $n_X=0$ for the second pixel, $n_X=1$ for the third pixel, etc. A value of $X_0$ is stored in the non-volatile memory 49 during factory calibration and transferred to the registers 79 (FIG. 7) during system initialization, and $H_X^2$ is stored by the DSP 55 for the type of scan that is to take place. The registers 79 also store at least one bit that is set by the DSP 55 to indicate when the shading correction is to be omitted.

Since the scan pattern is known to move from pixel-to-pixel across one line, then the same on another line, the calculations of equations (1) and (2) need not be made for each pixel but rather the process can be considerably simplified. Since the radius function $R_0^2$ of the first pixel 151 is known, the radius function for each other pixel is calculated by building upon it. When scanning across a row, $r_i^2$ of a pixel other than the first pixel is calculated by adding the following to the radius value of the immediately preceding pixel:

$$(1+2m_X)H_X^2 \tag{7}$$

where $m_x$ is the number of $H_X$ steps passed from the initial pixel in the row of pixels. Similarly, the $R_{INIT}^2$ of each row after the first is calculated by adding the following to the $R_{INIT}^2$ of the immediately preceding line:

$$(1+2m_Y)H_Y^2 \tag{8}$$

where $m_y$ is the number of $H_Y$ steps passed from top row. The calculations of equations (7) and (8) are much simpler to make than those of equations (5) and (6), so the circuits 73 (FIG. 2) can be made simple and the radius function may be calculated for each new pixel. The simplified equation (3) is derived by taking differences of the radius function of equation (2) for successive pixels in a row. Similarly, the simplified equation (4) is derived by taking differences of the radius function of equation (1) for successive lines of pixels.

Since each camera's optical system, sensor or physical configuration can have different imaging and other characteristics, each unit is preferably calibrated as part of the manufacturing process and parameters resulting from that calibration stored in the non-volatile memory 49 (FIG. 2) for transfer during system initialization to the registers 79 (FIGS. 2 and 7). A uniformly white two-dimensional scene 31 (FIG. 1) is imaged onto the sensor 35. The sensor 35 is then scanned and the image data stored directly in the memory 47 through the memory management unit 57, without lens shading correction or any other such modification. Because of the lens shading effect, however, the stored video data will not have a uniform intensity across the frame. This stored image frame data is then processed by the DSP 55 to determine the center of gravity, the coordinates $(X_C, Y_C)$, using equation (2) above. The pixel at $(X_C, Y_C)$ is often the center pixel 153 (FIG. 6) of the optical system, which is usually the point of maximum intensity of an image 29 (FIG. 1) of a scene 31 with a uniform intensity across it but not necessarily the center of the optical system. The coordinates $(X_0, Y_0)$ of the upper-left corner pixel are determined by defining edges of the image frame on the photo-detector array of the sensor 35. After the center and corner coordinates have been determined, the maximum radius value $R_0^2$ is then calculated. From the stored pattern's center of gravity $(X_C, Y_C)$, and the coordinates of each pixel in the image (X, Y), a full set of correction factors, one for each pixel is calculated by equation (4) for a circular intensity distribution approximation. To reduce this full set of correction factors to the sparse set stored within the camera itself, only the correction factors from those pixels which lie beneath the intersections of a course grid overlaid on the full image data set are chosen for storage in and use by the camera.

This process corrects for any intensity shading introduced by the optical system 13, the sensor 29 (FIG. 1), or other internal camera variations, such as reflections off of internal camera surfaces. However, if the sensor 29 needs no correction, then the correction that is made is for the lens system 13 alone. Similarly, if the lens system 13 is made to form the image 29 without imparting intensity variations across it, then the correction that is made is for the sensor 29 alone.

Elliptical and Hyperbolic Intensity Pattern Model

Instead of employing a circular approximation model of the intensity distribution, another geometric approximation may be used for some light distributions if it better characterizes the distribution. Elliptical and hyperbolic shading pattern approximations are examples of such others that may be used. In such a case, the individual pixel correction factor is used according to the following equation:

$$\text{PixelOut} = \text{PixelIn} * F[a(X-X_C)^2 + b(Y-Y_C)^2 + c(X-X_C)(Y-Y_C)] \tag{9}$$

where PixelOut is the corrected pixel, PixelIn is the pixel before correction and F[a( ... )] is the correction factor, which depends on the distance from the pixel location (X, Y) to the anchor point ($X_C$, $Y_C$). Constants a, b and c define the shape and size of an ellipse or hyperbola.

FIG. 8 illustrates an ellipse 161 with the parameters of equation (9) shown. The quantity "a" is one-half the major axis and "b" is one-half of the minor axis of the ellipse. The quantity "c" is one-half the distance between foci 163 and 165. Added to these standard mathematical quantities is a point 167, midway along a major axis that passes through the foci 163 and 165, that is the optical center ($X_C$, $Y_C$) of an elliptical light distribution. The ellipse 161 represents regions of equal intensity of such a distribution. If the relative values of the constants a, b and c are such as to cause the quantity within the brackets of Equation (9) to define a hyperbola, then it is the hyperbola that shows the locations of the distribution having equal intensity.

An elliptical or hyperbolic intensity distribution over a two-dimensional surface can be defined by a family of such curves representing contours of the distribution with intensity values extending out the page, or, if an inverse of a correction distribution is shown, with intensity correction values extending into the page. An example illustrated in FIG. 9 shows an elliptical intensity distribution of a uniform white light image (intensity drop-off at the edges relative to the middle) or a distribution of corrective factors that are applied to acquired image data (an inverse function with higher values at the edges than in the middle). Each of the ellipses 171, 172, 173 and 174 of such a family includes those points of the distribution having the same relative value "v", a fraction representing the relative height of the contour between a maximum intensity (v=1.0) and a minimum intensity (v=0) of the distribution.

In order to characterize the distribution by a small amount of data sufficient to correct image data that can be stored in a small amount of memory, data is acquired during calibration along a number of lines 177, 178, 179, 180, 181, 182, 183 and 184 shown in FIG. 9 to extend across the distribution. Each of these lines extends between the optical center ($X_C$, $Y_C$) and edges of the image field, in this example intersecting midpoints along the lengths of these edges and all four corners. A shape of the distribution can be obtained from the intensity values of the ellipses where crossed by these lines. The values at points 185, 186, 187 and 189 along the line 177 can be illustrated, for example, as values 185', 186', 187' and 189' of FIG. 10. A curve is fit to these values, in the same manner as described above for the circular distribution case. Another curve 178' is included in FIG. 10, passing through points 191', 192' and 193' that are the respective intensity values of ellipse intersection points 191, 192 and 193 along the line 178 of FIG. 9. Although the values of these sets of points are the same, their spacing is different, thereby resulting in the curves 177' and 178' being shifted with respect to each other. Points from the other lines 179-184 typically generate different individual curves. These correction factor data from some or all of the lines 177-184 are used to correct image data from the photo-sensor, in this example. Although the multiple sets of correction data from points along different ones of the lines 177-184 may become correction data, a specific example described below utilizes a single correction factor curve that fits an average of such data points, as a further simplifying approximation.

As with the circular pattern approximation methods, this correction factor curve is stored in hardware as a piece-wise linear approximation thereof. A look up table (LUT) of 64 entries per color (a total of 192 entries) is stored. Each entry represents the correction factor at one point a distance from the anchor point. The value of the correction factor at one point and the slope from that point to the next point are stored in each entry. Therefore, when calculating the value of the correction factor at some point (X, Y) relative to the anchor point ($X_C$, $Y_C$), we find the closest entry for a position below (X, Y) in the LUT, and from the value and slope of that entry a linear approximation of the correction factor at point (X, Y) is calculated.

In terms of memory and processing power, performing this computation by the use of hardware, in real time can be expensive. Therefore, the simplified calculation techniques described above for the circular pattern correction are also applied when the pattern is elliptical or hyperbolic. Since the pixels to be corrected arrive in a known order as function of time "t", the raster order, a difference equation method is used to calculate the square of the distance to the anchor point using the square of the distance calculated to the previous pixel. This is done by using adders instead of multipliers. As with the circular distribution case described above, an incremental radial distance to the next pixel in scan order is calculated by adding an incremental step to the radial distance calculated for the prior pixel.

Elliptical and Hyperbolic Intensity Pattern Calibration

The acquisition of calibration data when an elliptical or hyperbolic correction factor distribution is assumed is initially to that of the circular pattern case. A uniformly white two-dimensional scene 31 (FIG. 1) is imaged onto the sensor 35 of the digital camera depicted in FIG. 1. The sensor 35 is then scanned and the image data stored directly in the memory 47 through the memory management unit 57, without lens shading correction or any other such modification. Because of the lens shading effect, however, the stored video data will not have a uniform intensity across the frame. The coordinates ($X_0$, $Y_0$) of the upper-left corner pixel are then determined by defining edges of the image frame on the photo-detector array of the sensor 35. This stored image frame data, in conjunction with ($X_0$, $Y_0$), is then processed by the DSP 55 to determine its center of gravity, the coordinates ($X_C$, $Y_C$). After the center and corner coordinates have been determined, the maximum radius value is then calculated. From the stored image's center of gravity ($X_C$, $Y_C$) and the coordinates of each pixel in the image, a full set of correction factors, one for each pixel, is calculated.

The following outlines the steps, in a specific example, to calibrate a camera or other optical system when an elliptical or hyperbolic correction factor distribution model is utilized:

1) The image data from a uniform white image is captured before the shading correction stage in the camera being calibrated. In other words, the shading correction stage is bypassed.

2) The maximum image size and the image origin ($X_0$, $Y_0$) are defined. The start of the image window ($X_0$, $Y_0$) relative to the origin is defined.

3) The white calibration image is divided into blocks of 8×8 pixels. If the image size is not a multiple of eight, the difference is compensated for from both opposite image edges. For each block, the average of the red pixels is calculated, the average of the green pixels is calculated, and the average of the blue pixels is calculated. For each block, the average pixel intensity level is calculated as a weighted average function of the red, green and blue average values of that block. The calculations that follow in this description are performed on block values and not on individual pixel values.

4) The center of gravity (optical center) of the shading pattern $(X_C, Y_C)$ is found by taking an equal height intensity contour, and finding its center of gravity.
   a) The center of gravity of the shading pattern is calculated according to the intensity values of the image.
   b) The contour height is taken to be Min_Height+0.8*(Max_Height−Min_Height), where Min_Height is the minimal intensity value in the image, and Max_Height is taken to be the maximal intensity value in the image. A relatively high contour is taken, so that it will most likely be fully contained inside the image. If the contour is cut by the edges, slight inaccuracies may occur.
   c) For each horizontal coordinate x (each column in the image), f(x) is calculated, the number of intensity values that surpass the predefined contour height. Then $X_C$ is calculated according to Xc=å*x*f(x)/åf(x). Similarly, for each vertical coordinate y (each line in the image), f(y), the number of intensity values that surpass the predefined contour height, is calculated. Then Yc is calculated according to Yc=å*y*f(y)/åf(y).
5) After determining the optical center, the elliptic\hyperbolic shape that best approximates the shape of the image shading pattern is determined. In effect, this means finding a, b and c so that a 2-dimensional function $p(x_i, y_i) = a*(x_i-X_C)^2 + b*(y_i-Y_C)^2 + c*(x_i-X_C)*(y_i-Y_C)$ will be as close as possible to the shape of the image shading pattern.
   a) The elliptical/hyperbolic shape values a, b and c are calculated according to the intensity values of the image.
   b) The values a, b and c are found by analytic minimization of the following expression: $å[a*(x_i-X_C)^2 + b*(y_i-Y_C)^2 + c(x_i-X_C)*(y_i-Y_C) - v]^2$
   where $\{(x_i, y_i)\}$ are points on a predefined equal height contour, and v is the height of the contour. The result is the following set of 3 equations:

$a*å[(x_i-X_C)^4] + b*å[(y_i-Y_C)^2*(x_i-X_C)^2] + c*å[(x_i-X_C)^3*(y_i-Y_C)] = å[v*(x_i-X_C)^2]$     i)

$a*å[(x_i-X_C)^2*(y_i-Y_C)^2] + b*å[(y_i-Y_C)^4] + c*å[(x_i-X_C)*(y_i-Y_C)^3] = å[v*(y_i-Y_C)^2]$     ii)

$a*å[(x_i-X_C)^3*(y_i-Y_C)] + b*å[(y_i-Y_C)^3*(x_i-X_C)] + c*å[(x_i-X_C)^2*(y_i-Y_C)^2] = å[v*(x_i-X_C)*(y_i-Y_C)]$     iii)

c) The values of a, b and c are found by solving this set of three equations by a known technique.
   d) The height of the predefined equal height contour is taken to be Min_Height+0.65*(Max_Height−Min_Height), where Min_Height is the minimum intensity value in the image, and Max_Height is the maximum intensity value in the image. This time, the contour is lower so that the calculation will be more accurate at the distant parts of the image that are closer to the corners. If the contour is cut by the edges of the image, it should not have a significant effect on the result of the calculation mentioned above.
   e) If $c^2 - 4*a*b >= 0$, the shape that was found is hyperbolic and, as a result, there are two possible hyperbolas: one has a, b and c as parameters, and the other has −a, −b and −c as parameters. Note that in case of an hyperbola, $P(x_i, y_i)$ may get negative values in some parts of the image. Since the image shading correction hardware ignores these parts, it is important to make sure that the parts of the image that need to be corrected correspond to the parts of the image where $P(x_i, y_i)$ is positive. One of the two possible hyperbolas mentioned above accomplishes this condition, and will produce relatively small error. The other hyperbola does not accomplish this condition and will produce relatively large error. By calculating the error we identify which of the two possible hyperbolas is the correct one.
   f) Finally, the parameters a, b and c are normalized so that they will have the same range of values independent of the image size. This is done by normalizing Pmax (maximal value of $P(x_i, y_i)$) to a value dependent on the image size. Pmax is normalized to values that have 111111 in the 6 MSB's, which means that the lookup table (LUT) will be fully used.
6) Next, the value of each block is divided by the value at the center of gravity, for scaling. To find the image shading correction factor $(K_i)$ at each picture element of the image, the inverse of each scaled value is taken.
7) To calculate a single image shading correction function f_IS_color(P), six straight lines are taken, each one connecting the center of gravity of the image shading pattern to one of six edge points, four corners and two points in the middle of the horizontal edges of the image, as illustrated in FIG. 9. The K values along these lines are approximated by a third order polynomial. By averaging the slowest rising polynomial and the fastest rising polynomial the correcting function f_IS_color(P) is produced. The following are the details of this analysis:
   a) The P values at each one of the six edge-points (see FIG. 9) are checked. Edge-points that have negative P values are ignored (this may happen in the case of a hyperbola). As mentioned before, $P(x_i, y_i) = a*(x_i-X_C)^2 + b*(y_i-Y_C)^2 + c*(x_i-X_C)*(y_i-Y_C)$.
   b) If all the six edge points were ignored, take the two edge points in the middle of the vertical edges (FIG. 9).
   c) For each one of the lines connecting the remaining edge-points find a polynomial dependent on P values, $1 + a1*P + a2*P^2 + a3*P^3$, that will be as close as possible to the K values along the line. The parameters a1, a2 and a3 are found by analytic minimization of the following expression:

$å[1 + a1*P_i + a2*P_i^2 + a3*P_i^3 - K_i]^2$ where:
   $\{P_i\}$ are the P values of the points along the line, and $\{K_i\}$ are the K values of the points along the line.
   The result is the following set of 3 equations:

$a1*åP_i^2 + a2*åP_i^3 + a3*åP_i^4 = å[(K_i-1)*P_i]$ $a1*åP_i^3 + a2*åP_i^4 + a3*åP_i^5 = å[(K_i-1)*P_i^2]$ $a1*åP_i^4 + a2*åP_i^5 + a3*åP_i^6 = å[(K_i-1)*P_i^3]$

The quantities a1, a2 and a3 are found by solving this set of three equations by known methods.
   d) For each polynomial, the value of the derivative for the maximal value of P is calculated. If the result is negative, the polynomial is not monotonically increasing for the relevant P values. This may happen if the line that was taken for the approximation is relatively short. In such a case, the polynomial and the line that produced it are ignored.
   e) The slowest rising polynomial and the fastest rising polynomial are averaged to get the final values of a1, a2 and a3.

The correcting function f_IS_color(P) is then calculated by $f\_IS\_color(P) = \min(2047, 256*(1 + a1*P + a2*P*P + a3*P*P*P) + 0.5)$ This equation indicates that the correction factors produced by this function are limited to 11 total bits (2047) with an 8-bit fraction (256).

The result of using the calibrated function is illustrated in FIG. 11, with an example set of curves. Curve 195 shows an output of the photo-sensor across a row of elements including the optical center ($X_C$, $Y_C$), when the photo-sensor is uniformly illuminated with the color or colors represented by the output 195. The output falls at the ends of the line, adjacent opposite edges of the photo-sensor. A calibrated correction function 197 ideally provides an inverse of the curve 195, so that when the two are combined together, a uniform intensity function 199 results. It is this uniform function that is then used by the camera or other optical device to represent data of the light pattern incident on the photo-sensor.

Compensation for Multiple Shading Patterns

As previously stated, shading non-uniformity can be attributed to many simultaneous factors. To further compensate for multiple shading phenomena, an extension of the above-described techniques adds flexibility by using the principle of superposition. The center of gravity of each shading pattern, ($X_C$, $Y_C$) is defined by the "center of gravity" equation 2 above. The composite shading pattern to be corrected is composed of several shading phenomena superimposed on one another. These phenomena are preferably separated at calibration time and multiple shading patterns are visualized, each with its own center of gravity. These centers of gravity can then be combined into an "effective center of gravity" and used to form lookup table 77 of FIG. 2, or each used individually to derive separate look up tables which are subsequently combined to form lookup table 77. In this latter case, the algorithm employed to combine these shading correction factors for use in table 77 can be either linear, piece-wise linear, or non-linear. Thus, a large degree of flexibility in choosing shading density correction factors with respect to a particular image element location is provided.

If an effective center of gravity is employed for the implementation of this extension, two or more centers of gravity can be algorithmically combined to create the effective center of gravity, by the use of a simple linear averaging of the coordinates of each of the one or more calculated centers of gravity, in accordance with equation (3) above. An example of this is illustrated in FIG. 12, where, in addition to the elliptical shading pattern of FIG. 9 having a center of gravity ($X_{C1}$, $Y_{C1}$), a circular shading pattern having a center of gravity ($X_{C2}$, $X_{C2}$) is present. An effective center of gravity ($X_{CE}$, $Y_{CE}$) may be calculated by use of equation (3). Correction values for each pixel may be obtained in the manner described above with respect to FIG. 9, except the center of gravity is now ($X_{CE}$, $Y_{CE}$) and the values of the shading patterns ascertained along the lines 177-184 originating at that center are an arithmetic combination of the values of each of the two shading patterns. However, the principles of this extension do not preclude the use of more complex, linear and non-linear weighting functions to effect this combining.

If the second form of this extension described above near the beginning of the Detailed Description is utilized, the elements in lookup table 77 are calculated as a function of the distance between a picture element and multiple centers of gravity. The calibration time calculation of correction factors in this approach is likewise accomplished by isolating each shading phenomena. However, in this case, the individual correction factor tables derived from the centers of gravity from two or more shading patterns are algorithmically combined to create the correction factors used in table 77. Table 77 can then be used to compensate for the superposition of these multiple shading phenomena. The algorithm employed to derive these combined shading correction factors can use either linear, piece-wise linear, or non-linear weighting, thus providing a large degree of flexibility in choosing shading density correction factors with respect to a particular image element location. If a linear approach is used, the effective correction factor at a pixel location represented in lookup table 77 can be calculated by the use of the simple linear averaging of the correction factors located at the corresponding image element location in individual shading pattern correction factor tables, as shown in the following equation:

$$FEN=[(F1+F2+F3 \ldots +FN)/N] \quad (10)$$

where FEN is the effective shading pattern correction factor for a particular image element, F1, F2, F3 . . . FN are corresponding individual image element correction factors in each pre-combined lookup table, and N is the total number of shading pattern correction lookup tables being combined.

Alternately, averaging or complex algorithmic processing of shading correction factors from multiple neighboring image element locations obtained from individual shading phenomena correction tables may be performed, to effect the desired combination of shading correction factors for inclusion in table 77.

Another way to compensate for a multiple shading phenomena superimposed one upon another is to use the same calibration method mentioned above, where each shading phenomena is visualized individually. However, instead of combining the data of the measured shading phenomena into one "effective center of gravity" or one "effective shading pattern correction factor table", the shading processor 71 of FIG. 2 employs multiple "shading processing" elements in which each of these "shading processing" elements is responsive to an individual shading phenomena measured at calibration time. At the time of image shading correction each "shading processing" element calculates the shading correction factors responsive to each individual shading phenomena. The actual shading correction factor applied to a pixel being corrected is computed from the individual correction factors calculated for this pixel by these multiple "shading processing" elements. This computation can be based on a linear, piece-wise linear or non-linear combination of multiple correction factors.

Extended Method Calibration

The calibration process employed by this extension to obtain shading correction factors, along with other parameters, for use in the digital camera shown in FIG. 1, will now be discussed. These shading correction factors are stored in non-volatile memory 49 (FIG. 2), for transfer during system initialization to the registers 79 (FIGS. 2 and 7). The calibration process employed is essentially the same as that described above except that it is repeated for multiple shading patterns a number of times equal to the number of shading patterns. As previously discussed, these shading patterns can be the result of simultaneously occurring phenomena, such as non-uniform image sensor sensitivity, lens vignetting, non-perpendicularly of the image sensor with respect to the central axis of the lens, lens mounting azimuth errors, and internal camera reflections.

Each of these shading patterns has its own unique center of gravity, as calculated by the methods previously discussed. During the execution of this extended method calibration procedure, these two or more centers of gravity are algorithmically combined to form an "effective center of gravity", which is used in place of the singular center of gravity during the process of calculating shading correction factors described in detail above. For the simple case the combining algorithm used to derive the effective center of gravity, ($X_{CE}$, $Y_{CE}$), is the simple linear averaging of the coordinates of each of the two or more calculated centers of gravity, as previously shown in Equation 3. Additional linear or non-linear weighting factors are incorporated into this equation, as shown below in Equation 11, to improve the resulting shading correction and add flexibility.

$$(X_{CE}, Y_{CE}) = [(W1X_{C1} + W2X_{C2} + W2X_{C3} \ldots + WNX_{CN})/N], [(W1Y_{C1} + W2Y_{C2} + W3Y_{C3} \ldots + WNY_{CN})/N] \quad (11)$$

Where:

$(X_{CE}, Y_{CE})$=The coordinates of the effective center of gravity;

$(X_{CN}, Y_{CN})$=The coordinates of each of the individual centers of gravity associated with each shading phenomena;

N=The total number of individual centers of gravity; and (W1, W2, W3 . . . WN)=Center of Gravity weighting factors.

Alternatively, sets of shading correction factor elements are calculated as functions of the distances between a picture element and multiple centers of gravity. In this case, the individual correction factor tables derived are algorithmically combined to create the correction factors stored in the form of a lookup table in non-volatile memory 49. The algorithm employed to derive these combined shading correction factors can use either linear, piece-wise linear, or non-linear weighting, thus providing a large degree of flexibility in choosing shading density correction factors with respect to a particular image element location. If a linear approach is used, the effective correction factor at a particular image element location is calculated by simple linear averaging of the correction factors located at corresponding image element locations in individual shading pattern correction factor tables, as previously shown in Equation 10. Additional linear or non-linear weighting is incorporated into this equation, as shown below in Equation 12, to improve the resulting shading correction and add flexibility.

$$FEN = [(W1F1 + W2F2 + W3F3 \ldots + WNFN)/N] \quad (12)$$

Where:

FEN=Effective shading pattern correction factor for a particular image element; F1, F2, F3; FN=Corresponding individual image element correction factors in each pre-combined lookup table; N=The total number of shading pattern correction lookup tables being combined; and (W1, W2, W3 . . . WN)=Weighting constants, from linear or non-linear derivations, for each image element shading correction factor, in each pre-combined lookup table.

In the case of multiple "shading processing" elements, the shading processing 71 of FIG. 2, part of the "video signal processor" of 43 FIG. 1, the calibration process stores different correction parameters responsive to different shading phenomena. At the time of image shading correction, these correction parameters are used by these multiple "shading processing" elements to determine the correction factor applied to the image data being processed.

CONCLUSION

Although the present invention has been described with respect to certain embodiments, it will be understood that the invention is entitled to protection within the full scope of the appended claims.

The invention claimed is:

1. A method for modifying an image of an optical field incident on a photo-sensor, comprising:

at a first rate, receiving from the photo-sensor a signal for the image formed from a two-dimensional array of pixels that are outputted from a plurality of photo-detectors of the photo-sensor imaging the optical field;

calculating a distance of each pixel from at least one particular point within the image, based on a position of each pixel in the two-dimensional array of pixels;

determining a modification factor for each pixel based at least on its calculated distance and on at least two independently determined intensity distribution patterns that are attributable to separate phenomena, each pattern characterized by at least one stored set of points and each determined through a separate calibration of the photo-sensor imaging a uniform intensity optical field under a particular procedure;

modifying an intensity of each pixel based at least on its determined modification factor, at a second rate that is at least as fast as the first rate; and outputting a modified image that is formed from the modified pixels.

2. The method of claim 1, wherein the at least two intensity distribution patterns include at least one of a hyperbolic and an elliptical intensity distribution pattern.

3. The method of claim 1, wherein at least one of the intensity distribution patterns characterizes an intensity variation introduced by a sensitivity variation across the photo-sensor imaging the uniform intensity optical field.

4. The method of claim 1, wherein at least one of the intensity distribution patterns characterizes an intensity variation introduced by at least one reflection off an internal surface of an enclosure housing the photo-sensor.

5. The method of claim 1, wherein the at least one stored set of points includes a set of points that characterizes at least one of the intensity distribution patterns for each of a plurality of color components.

6. The method of claim 1, wherein the at least one particular point is an optical center of the image.

7. The method of claim 1, wherein the second rate is substantially equivalent to the first rate.

8. An imaging apparatus, comprising:

at least one photo-sensor including a plurality of photo-detectors, configured to output a signal for an image formed from a two-dimensional array of pixels that are outputted from the plurality of photo-detectors of the photo-sensor imaging an optical field;

an optical system configured to direct the image of the optical field onto the at least one photo-sensor;

a memory for storing data; and a processor enabled to perform actions including:

at a first rate, receiving from the at least one photo-sensor the signal for the image;

calculating a distance of each pixel from at least one particular point within the image, based on a position of each pixel in the two-dimensional array of pixels;

determining a modification factor for each pixel based at least on its calculated distance and on at least two independently determined intensity distribution patterns that are attributable to separate phenomena, each pattern characterized by at least one set of points stored in the memory and each determined through a separate calibration of the at least one photo-sensor imaging a uniform intensity optical field under a particular procedure;

modifying an intensity of each pixel based at least on its determined modification factor, at a second rate that is at least as fast as the first rate; and outputting a modified image that is formed from the modified pixels.

9. The imaging apparatus of claim 8, wherein the at least two intensity distribution patterns include at least one of a hyperbolic and an elliptical intensity distribution pattern.

10. The imaging apparatus of claim 8, wherein at least one of the intensity distribution patterns characterizes an intensity variation introduced by a sensitivity variation across the at least one photo-sensor imaging the uniform intensity optical field.

11. The imaging apparatus of claim 8, further comprising an enclosure that houses the at least one photo-sensor and the optical system, and wherein at least one of the intensity distribution patterns characterizes an intensity variation introduced by at least one reflection off an internal surface of the enclosure.

12. The imaging apparatus of claim 8, wherein the at least one stored set of points includes a set of points that characterizes at least one of the intensity distribution patterns for each of a plurality of color components.

13. The imaging apparatus of claim 8, wherein the at least one particular point is an optical center of the image.

14. The imaging apparatus of claim 8, wherein the second rate is substantially equivalent to the first rate.

15. A processor readable storage medium storing executable instructions that enable actions for modifying an image of an optical field incident on a photo-sensor, comprising:
   at a first rate, receiving from the photo-sensor a signal for the image formed from a two-dimensional array of pixels that are outputted from a plurality of photo-detectors of the photo-sensor imaging the optical field;
   calculating a distance of each pixel from at least one particular point within the image, based on a position of each pixel in the two-dimensional array of pixels;
   determining a modification factor for each pixel based at least on its calculated distance and on at least two independently determined intensity distribution patterns that are attributable to separate phenomena, each pattern characterized by at least one stored set of points and each determined through a separate calibration of the photo-sensor imaging a uniform intensity optical field under a particular procedure;
   modifying an intensity of each pixel based at least on its determined modification factor, at a second rate that is at least as fast as the first rate; and
   outputting a modified image that is formed from the modified pixels.

16. The processor readable storage medium of claim 15, wherein the at least two intensity distribution patterns include at least one of a hyperbolic and an elliptical intensity distribution pattern.

17. The processor readable storage medium of claim 15, wherein at least one of the intensity distribution patterns characterizes an intensity variation introduced by a sensitivity variation across the photo-sensor imaging the uniform intensity optical field.

18. The processor readable storage medium of claim 15, wherein at least one of the intensity distribution patterns characterizes an intensity variation introduced by at least one reflection off an internal surface of an enclosure housing the photo-sensor.

19. The processor readable storage medium of claim 15, wherein the at least one stored set of points includes a set of points that characterizes at least one of the intensity distribution patterns for each of a plurality of color components.

20. The processor readable storage medium of claim 15, wherein the at least one particular point is an optical center of the image.

21. The processor readable storage medium of claim 15, wherein the second rate is substantially equivalent to the first rate.

22. An integrated circuit chip containing circuits configured to perform actions for modifying an image of an optical field incident on a photo-sensor, comprising:
   at a first rate, receiving from the photo-sensor a signal for the image formed from a two-dimensional array of pixels that are outputted from a plurality of photo-detectors of the photo-sensor imaging the optical field;
   calculating a distance of each pixel from at least one particular point within the image, based on a position of each pixel in the two-dimensional array of pixels;
   determining a modification factor for each pixel based at least on its calculated distance and on at least two independently determined intensity distribution patterns that are attributable to separate phenomena, each pattern characterized by at least one stored set of points and each determined through a separate calibration of the photo-sensor imaging a uniform intensity optical field under a particular procedure;
   modifying an intensity of each pixel based at least on its determined modification factor, at a second rate that is at least as fast as the first rate; and
   outputting a modified image that is formed from the modified pixels.

23. The integrated circuit chip of claim 22, wherein the at least two intensity distribution patterns include at least one of a hyperbolic and an elliptical intensity distribution pattern.

24. The integrated circuit chip of claim 22, wherein the at least two intensity distribution patterns include a circular distribution pattern.

25. The integrated circuit chip of claim 22, wherein at least one of the intensity distribution patterns characterizes an intensity variation introduced by a sensitivity variation across the photo-sensor imaging the uniform intensity optical field.

26. The integrated circuit chip of claim 22, wherein at least one of the intensity distribution patterns characterizes an intensity variation introduced by at least one reflection off an internal surface of an enclosure housing the photo-sensor.

27. The integrated circuit chip of claim 22, wherein the at least one stored set of points includes a set of points that characterizes at least one of the intensity distribution patterns for each of a plurality of color components.

28. The integrated circuit chip of claim 22, wherein the at least one particular point is an optical center of the image.

29. The integrated circuit chip of claim 22, wherein the second rate is substantially equivalent to the first rate.

\* \* \* \* \*